United States Patent
Kim et al.

(10) Patent No.: US 12,438,724 B2
(45) Date of Patent: Oct. 7, 2025

(54) ELECTRONIC DEVICE FOR ENCRYPTING BIOMETRIC INFORMATION AND METHOD FOR OPERATING THE SAME

(71) Applicant: Samsung Electronics Co., Ltd., Suwon-si (KR)

(72) Inventors: Jungkon Kim, Suwon-si (KR); Wonsuk Jang, Suwon-si (KR); Jinsu Kim, Suwon-si (KR); Jongmin Choi, Suwon-si (KR); Minho Kim, Suwon-si (KR); Juwoan Yoo, Suwon-si (KR); Moonsoo Chang, Suwon-si (KR); Inmyung Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 87 days.

(21) Appl. No.: 18/582,191

(22) Filed: Feb. 20, 2024

(65) Prior Publication Data

US 2024/0291663 A1  Aug. 29, 2024

Related U.S. Application Data

(63) Continuation of application No. PCT/KR2024/001716, filed on Feb. 6, 2024.

(30) Foreign Application Priority Data

Feb. 27, 2023 (KR) .......................... 10-2023-0025669

(51) Int. Cl.
*H04L 9/32* (2006.01)
*G06V 40/16* (2022.01)

(52) U.S. Cl.
CPC .......... *H04L 9/3231* (2013.01); *G06V 40/168* (2022.01); *G06V 40/172* (2022.01); *H04L 9/3236* (2013.01)

(58) Field of Classification Search
CPC . H04L 9/3231; H04L 9/3236; H04L 2209/34; G06V 40/168; G06V 40/172
See application file for complete search history.

(56) References Cited

U.S. PATENT DOCUMENTS

| 11,017,067 B2 | 5/2021 | Smales |
| 2011/0037563 A1 | 2/2011 | Choi et al. |
| | (Continued) | |

FOREIGN PATENT DOCUMENTS

| CN | 114267064 A | 4/2022 |
| KR | 10-2003-0048390 A | 6/2003 |
| | (Continued) | |

OTHER PUBLICATIONS

Kim et al., "Iron Mask, Modular Architecture for Protecting Deep Face Template," Apr. 6, 2021.

(Continued)

*Primary Examiner* — Sangseok Park
(74) *Attorney, Agent, or Firm* — Jefferson IP Law, LLP

(57) ABSTRACT

An electronic device encrypting biometric information includes memory for storing instructions and a processor. The instructions may be configured to, when executed by the processor, cause the electronic device to obtain a transformation matrix that maps a first feature value related to first biometric information to a first codeword, generate a third feature value by applying the transformation matrix to a second feature value related to second biometric information, compare a cosine similarity between a second codeword most similar to the third feature value and the third feature value with a threshold, map the second feature value to the second codeword based on the cosine similarity being greater than the threshold, and generate a hashed second codeword based on the second codeword, and transmit or store the hashed second codeword.

20 Claims, 7 Drawing Sheets

(56) References Cited

U.S. PATENT DOCUMENTS

| | | | |
|---|---|---|---|
| 2015/0039899 A1 | 2/2015 | Bringer et al. | |
| 2015/0205998 A1* | 7/2015 | Suh ..................... | G06V 40/171 |
| | | | 382/118 |
| 2020/0210685 A1 | 7/2020 | Ko et al. | |
| 2020/0252217 A1* | 8/2020 | Mathieu ................ | H04L 9/3231 |
| 2021/0336792 A1 | 10/2021 | Agrawal et al. | |
| 2022/0382832 A1 | 12/2022 | Kim et al. | |

FOREIGN PATENT DOCUMENTS

| | | |
|---|---|---|
| KR | 10-1290997 B1 | 7/2013 |
| KR | 10-2018-0117715 A | 10/2018 |
| KR | 10-1984033 B1 | 5/2019 |
| KR | 10-2021-0099777 A | 8/2021 |
| KR | 10-2357694 B1 | 2/2022 |

OTHER PUBLICATIONS

International Search Report dated May 8, 2024, issued in International Application No. PCT/KR2024/001716.

* cited by examiner

ELECTRONIC DEVICE FOR ENCRYPTING BIOMETRIC INFORMATION AND METHOD FOR OPERATING THE SAME

CROSS-REFERENCE TO RELATED APPLICATION(S)

This application is a continuation application, claiming priority under § 365(c), of an International application No. PCT/KR2024/001716, filed on Feb. 6, 2024, which is based on and claims the benefit of a Korean patent application number 10-2023-0025669, filed on Feb. 27, 2023, in the Korean Intellectual Property Office, the disclosure of which is incorporated by reference herein in its entirety.

TECHNICAL FIELD

The disclosure relates to an electronic device for encrypting biometric information and a method for operating the same.

BACKGROUND ART

Recently, an authentication technique based on one or more physical and behavioral characteristics, such as fingerprint, iris, face, electrocardiogram, retina pattern, palm, or vein pattern, so-called biometrics recognition technology, has been actively used in various fields. Biometrics technology refers to a technology that extracts signals or data associated with the user's biometrics and compares them with previously stored data to identify and authenticate the user. For example, face recognition technology scans, stores, and recognizes the shape or thermal image of one's face through thermal infrared photography, three-dimensional (3D) measurement, or skeletal analysis, and compares the facial image captured by the camera with face information stored in database to identify the person. For example, facial recognition technology may be used as a way to simplify authentication procedures at airports, terminals, and banking transactions.

Because biometric information, such as facial images, may not be changed as desired by the user, like passwords or patterns, once exposed, the damage may be severe. Accordingly, technical means may be needed to strengthen the stability of the encryption key in encryption algorithms that use biometric information as an encryption key.

The above information is presented as background information only to assist with an understanding of the disclosure. No determination has been made, and no assertion is made, as to whether any of the above might be applicable as prior art with regard to the disclosure.

DISCLOSURE OF INVENTION

Solution to Problems

Aspects of the disclosure are to address at least the above-mentioned problems and/or disadvantages and to provide at least the advantages described below. Accordingly, an aspect of the disclosure is to provide an electronic device and an operation method thereof, to enhance the security of biometric information, such as facial images.

Another aspect of the disclosure is to provide an electronic device and an operation method thereof, to encrypt feature information used in biometrics recognition.

Another aspect of the disclosure is to provide an electronic device and an operation method thereof, to safely store feature information about biometrics recognition.

Additional aspects will be set forth in part in the description which follows and, in part, will be apparent from the description, or may be learned by practice of the presented embodiments.

In accordance with an aspect of the disclosure, an electronic device is provided. The electronic device includes memory for storing instructions and a processor operatively connected with the memory. The instructions are configured to, when executed by the processor, cause the electronic device to obtain a transformation matrix that maps a first feature value related to first biometric information to a first codeword. The instructions are configured to, when executed by the processor, cause the electronic device to generate a third feature value by applying the transformation matrix to a second feature value related to second biometric information. The instructions are configured to, when executed by the processor, cause the electronic device to compare a cosine similarity between a second codeword most similar to the third feature value and the third feature value with a threshold. The instructions are configured to, when executed by the processor, cause the electronic device to map the second feature value to the second codeword based on the cosine similarity being greater than the threshold. The instructions are configured to, when executed by the processor, cause the electronic device to generate a hashed second codeword based on the second codeword. The instructions are configured to, when executed by the processor, cause the electronic device to transmit or store the hashed second codeword.

In accordance with another aspect of the disclosure, a method for operating an electronic device to encrypt biometric information is provided. The method includes obtaining a transformation matrix that maps a first feature value related to first biometric information to a first codeword. The method may comprise generating a third feature value by applying the transformation matrix to a second feature value related to second biometric information. The method may comprise comparing a cosine similarity between a second codeword most similar to the third feature value and the third feature value with a threshold. The method may comprise mapping the second feature value to the second codeword based on the cosine similarity being greater than the threshold. The method may comprise generating a hashed second codeword based on the second codeword. The method may comprise transmitting or storing the hashed second codeword.

According to an embodiment of the disclosure, one or more non-transitory computer-readable storage medium storing one or more programs is disclosed. The one or more programs may comprises instructions configured to, when executed by a processor of an electronic device, cause the electronic device to: obtain a transformation matrix that maps a first feature value related to first biometric information to a first codeword, generate a third feature value by applying the transformation matrix to a second feature value related to second biometric information, compare a cosine similarity between a second codeword most similar to the third feature value and the third feature value with a threshold, map the second feature value to the second codeword based on the cosine similarity being greater than the threshold, and generate a hashed second codeword based on the second codeword, and transmit or store the hashed second codeword.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

MODE FOR THE INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
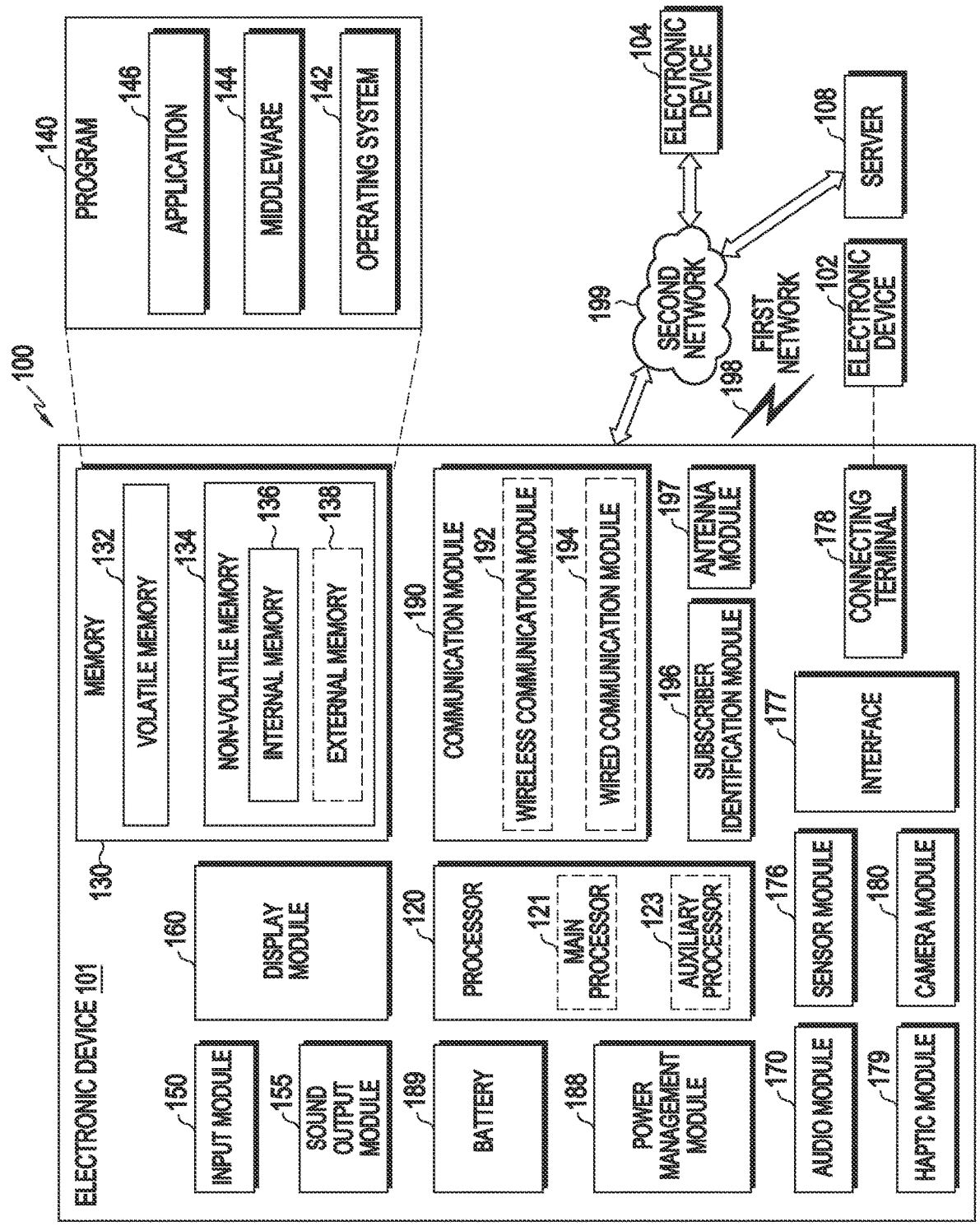
FIG. 1 is a view illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In an embodiment of the disclosure, at least one (e.g., the connecting terminal 178) of the components may be omitted from the electronic device 101, or one or more other components may be added in the electronic device 101. According to an embodiment of the disclosure, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment of the disclosure, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., a sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. The artificial intelligence model may be generated via machine learning.

Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor configured to detect a touch, or a pressure sensor configured to measure the intensity of a force generated by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an accelerometer, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to an embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a fifth generation (5G) network, a next-generation communication network, the Internet, or a computer network (e.g., a local area network (LAN) or a wide area network (WAN)).

These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 gigabits per second (Gbps) or more) for implementing eMBB, loss coverage (e.g., 164 dB or less) for implementing mMTC, or U-plane latency (e.g., 0.5 milliseconds (ms) or less for each of downlink (DL) and uplink (UL), or a round trip of 1 ms or less) for implementing URLLC.

The antenna module 197 may transmit or receive a signal or power to or from the outside (e.g., the external electronic device). According to an embodiment of the disclosure, the antenna module 197 may include one antenna including a radiator formed of a conductive body or conductive pattern formed on a substrate (e.g., a printed circuit board (PCB)). According to an embodiment of the disclosure, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment of the disclosure, other parts (e.g., radio frequency integrated circuit (RFIC)) than the radiator may be further formed as part of the antenna module 197.

According to various embodiments of the disclosure, the antenna module 197 may form a mmWave antenna module. According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, instructions or data may be transmitted or received between the electronic device 101 and the external electronic device 104 via the server 108 coupled with the second network 199. The external electronic devices 102 or 104 each may be a device of the same or a different type from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an Internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., a smart home, a smart city, a smart car, or health-care) based on 5G communication technology or IoT-related technology.

Figure 2:
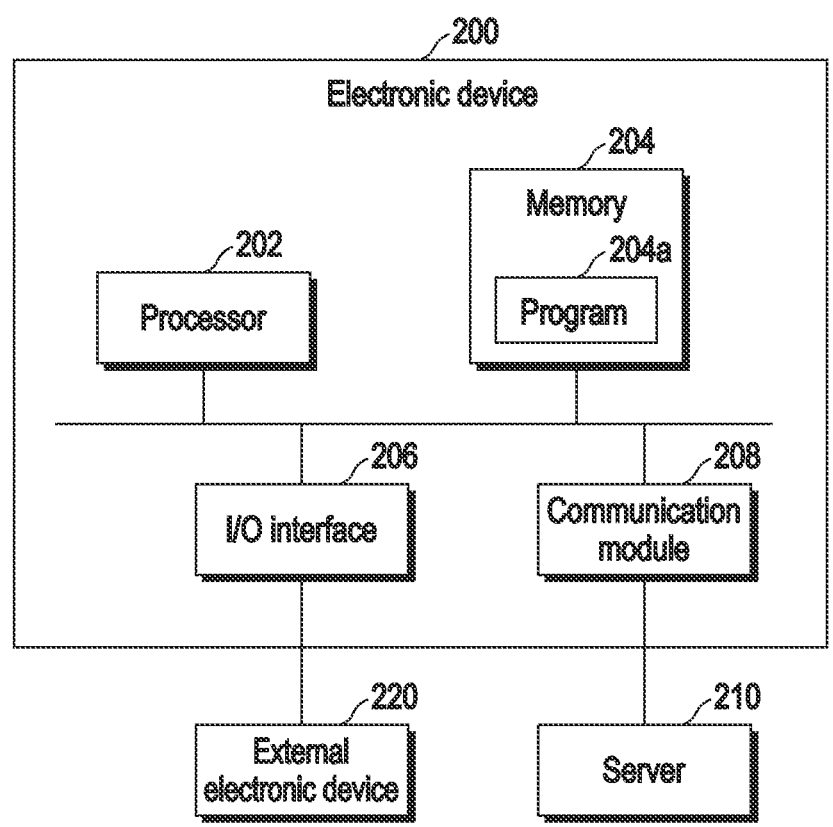
FIG. 2 is a block diagram illustrating a configuration of an electronic device to extract a facial feature according to an embodiment of the disclosure.

FIG. 2 is a block diagram illustrating a configuration of an electronic device to extract a biometric feature according to an embodiment of the disclosure. In the illustrated embodiments of the disclosure, each component may have different functions and capabilities other than those described below. Additional components may be included in addition to those described below.

Referring to FIG. 2, an electronic device 200 (e.g., the electronic device 101) may include a computing device. In an embodiment of the disclosure, the electronic device 200 may be a computing device that processes biometric information according to at least one of the embodiments of the disclosure. In an embodiment of the disclosure, the electronic device 200 may include at least one of a desktop computer, a laptop computer, a tablet, a smartphone, or a wearable device.

The electronic device 200 may include at least one processor 202 (e.g., the processor 120) and memory 204 (e.g., the memory 130) connected to the at least one processor 202 via a communication bus. The processor 202 may enable the electronic device 200 to operate according to at least one of embodiments described below. For example, the processor 202 may execute at least one program 204a stored in the memory 204. The at least one program 204a may include one or more computer-executable instructions to, when executed by the processor 202, enable the electronic device 200 to perform operations according to at least one of the embodiments of the disclosure.

The memory 204 may be configured to store computer-executable instructions or program codes, program data, and/or other suitable forms of information (e.g., facial feature information, codewords, and/or transformation matrix) and may provide the stored data to the processor 202. The program 204a stored in the memory 204 may include a set of instructions executable by the processor 202. In an embodiment of the disclosure, the memory 204 may be volatile memory (e.g., the volatile memory 132), such as random access memory, non-volatile memory (e.g., the non-volatile memory 134), or an appropriate combination thereof, one or more magnetic disk storage devices, optical disc storage devices, flash memory devices, other types of storage media accessible by the electronic device 200 and capable of storing desired information, or an appropriate combination thereof.

The electronic device 200 may include one or more input and output (I/O) interfaces 206 (e.g., the interface 177) that provide one or more interfaces for an external electronic device 220 and one or more communication modules 208 (e.g., the communication module 190) that communicate with a network device, such as a server 210. The input/output interface 206 and the communication module 208 may be connected to the processor 202 and/or the memory 204 through a communication bus.

The external electronic device 220 may be connected to other components (e.g., the processor 202) of the electronic device 200 through the input/output interface 206. In an embodiment of the disclosure, the external electronic device 220 may include at least one of a pointing device (e.g., a mouse or a trackpad), a keyboard, a touch input device (e.g., a touchpad or a touch screen), a voice or sound input device, various types of sensor devices, a camera or a photographing device, a display device, a printer, a speaker, or a network card. In an embodiment of the disclosure, the external electronic device 220 may include another computing device (e.g., the electronic device 101) configured similarly to the electronic device 200. In an embodiment of the disclosure, the electronic device 200 may include at least one input device, such as the input module 150, the sensor module 176, or the camera module 180, and/or at least one output device, such as the display module 160, as internal components.

The server 210 may communicate with the electronic device 200 (e.g., the processor 202) through the communication module 208. The communication module 208 may include one or more communication circuits (e.g., the wireless communication module 192 and/or the wired communication module 194) that support a wired communication technology and/or a wireless communication technology in an embodiment.

The program 204a stored in the memory 204 may include a feature extraction algorithm (e.g., a feature extraction module 604 or a feature extraction module 704) configured to extract a biometric feature from biometric information, such as a facial image. In an embodiment of the disclosure, the feature extraction algorithm may be used for face recognition. The feature extraction algorithm may include extracting facial component features, such as eyes, nose, or mouth from a human facial image. Facial feature extraction may be used to initialize processing techniques, such as face tracking, facial expression recognition, or face recognition.

For example, the processor 202 may extract at least one of the following features by executing the feature extraction algorithm of face recognition.

Distance between eyes,
Distance from forehead to chin,
Distance between nose and mouth,
Depth of eye socket,
Shape of cheekbone, or
Outline of lips, ears, or chin.

In an embodiment of the disclosure, the feature information including the features extracted by the feature extraction algorithm may be stored in the memory 204 to be used for future biometrics recognition, or may be transmitted to the server 210 through the communication module 208. In an embodiment of the disclosure, to enhance security of biometrics recognition, the electronic device 200 may encrypt the features before storing or transmitting the features.

The program 204a stored in the memory 204 may include a fuzzy extraction (FE) algorithm (e.g., an FE module 606 or an FE module 706) for removing noise of biometric information and encrypting the same. In an embodiment of the disclosure, the fuzzy extraction algorithm may define an error correction code (ECC) including codewords in a designated metric space, map a feature (e.g., a biometric feature) indicating biometric information to any one of the codewords in the ECC, and output a hashed codeword corresponding to the mapped codeword. The hashed codeword may be considered to include an encrypted feature corresponding to biometric information, and the processor 202 may recover an original feature (e.g., a biometric feature) from the hashed codeword through decryption.

The processor 202 may generate a hashed codeword corresponding to the biometric feature by executing the fuzzy extraction algorithm. In an embodiment of the disclosure, the hashed codeword generated by the fuzzy extraction algorithm may be stored in the memory 204 to be used for future biometrics recognition, or may be transmitted to the server 210 through the communication module 208. The processor 202 may perform biometrics recognition by comparing the biometric feature extracted from the biometric information (e.g., facial image) input when the biometrics recognition is requested with the biometric feature decrypted from the stored hashed codeword.

In an embodiment of the disclosure, the processor 202 may calculate a closeness (e.g., cosine similarity or angular distance) between the biometric feature extracted from the input biometric information and the decoded biometric feature. Each biometric feature may be represented by a feature vector in a designated space, and the processor 202 may calculate a cosine similarity (or angular distance metric) between two feature vectors corresponding to the two biometric features. The cosine similarity may be obtained using a cosine angle between two feature vectors, and may mean a similarity between the two feature vectors. The cosine similarity may be '1' when the directions of the two feature vectors are completely the same, '0' when the angle between the directions of the two feature vectors is 90 degrees, and '−1' when the angle between the directions of the two feature vectors is 180 degrees. The processor 202 may determine that as the cosine similarity approaches '1', the similarity between the two feature vectors increases.

The processor 202 may compare the cosine similarity with a threshold indicating the reference cosine similarity determined as the same person. When the cosine similarity is smaller than the threshold, the processor 202 may determine that the person corresponding to the input biometric information is different from the person corresponding to the stored hashed codeword. When the cosine similarity is not smaller than the threshold, the processor 202 may determine that the person corresponding to the input biometric information is the same as the person corresponding to the stored hashed codeword.

Figure 3:
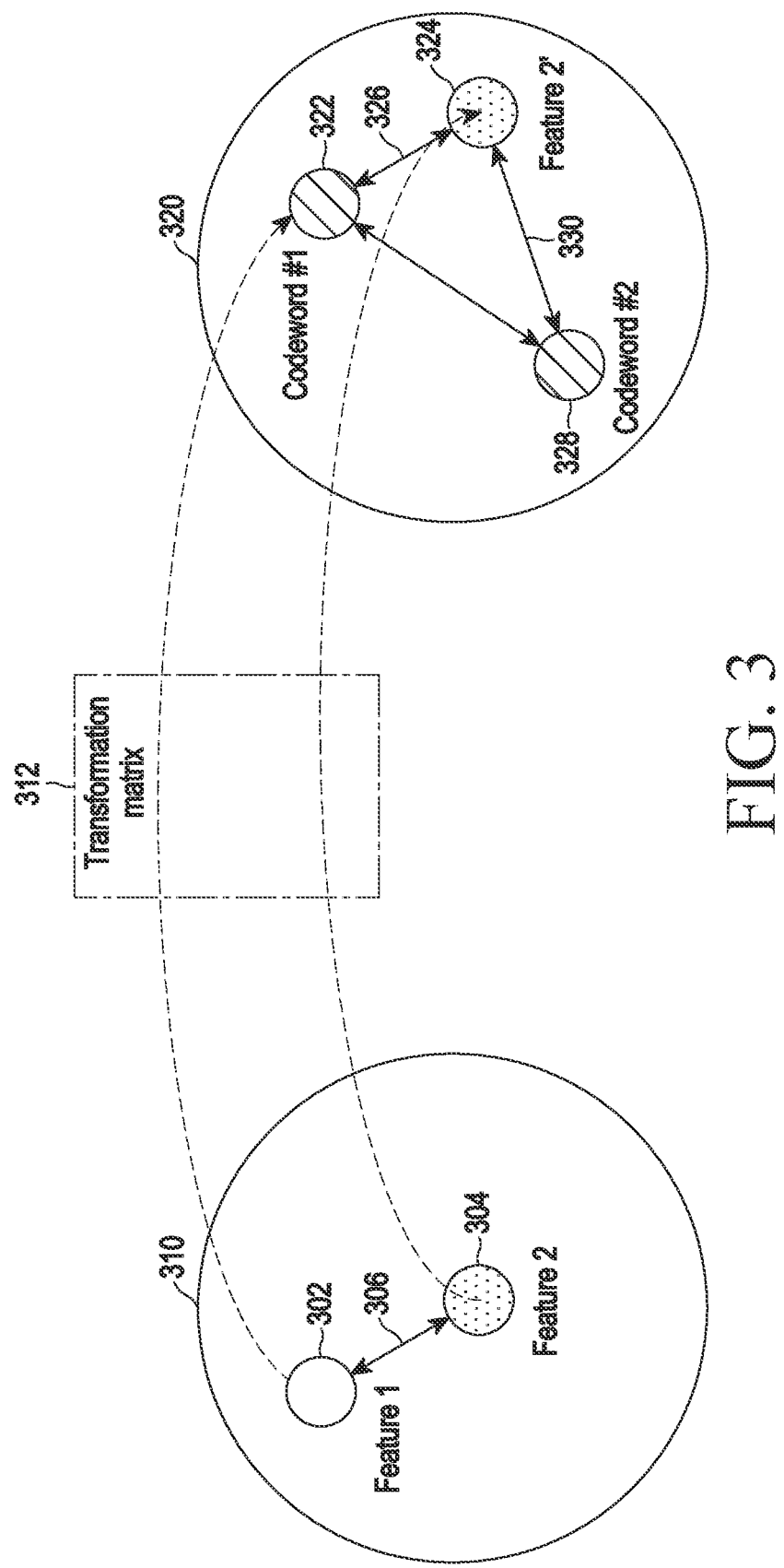
FIG. 3 is a view illustrating fuzzy extraction based on a mistake-based error correction code (ECC) according to an embodiment of the disclosure.

FIG. 3 is a view illustrating fuzzy extraction based on a mistake-based error correction code (ECC) according to an embodiment of the disclosure.

Referring to FIG. 3, the electronic device 200 (e.g., the processor 202) may extract feature 1 302 from the first biometric information by a feature extraction algorithm. In an embodiment of the disclosure, the first biometric information may be related to a facial image serving as a reference for biometrics recognition. Further, the electronic device 200 (e.g., the processor 202) may extract feature 2 304 from the second biometric information by the feature extraction algorithm. In an embodiment of the disclosure, the second biometric information may be related to a facial image subject to biometrics recognition. Based on the feature extraction algorithm, feature 1 302 and feature 2 304 may be represented as feature vectors in a designated unit sphere 310, and a cosine similarity 306 between feature 1 302 and feature 2 304 may be calculated. When encryption is not used, the electronic device 200 (e.g., the processor 202) may determine whether the person corresponding to feature 1 302 is the same as the person corresponding to feature 2 304, based on the cosine similarity 306.

When encryption is used, the electronic device 200 (e.g., the processor 202) may generate a linear transformation matrix 312 (e.g., an orthogonal matrix) that maps feature 1 302 to codeword #1 322 in the ECC 320 by a fuzzy extraction algorithm. In an embodiment of the disclosure, codeword #1 322 may include a real-valued codeword in the real-valued ECC 320. The electronic device 200 (e.g., the processor 202) may encrypt codeword #1 322 by a hash function to generate hashed codeword #1 (not shown). The electronic device 200 (e.g., the processor 202) may store the transformation matrix 312 and hashed codeword #1 in the memory 204 or may transmit the transformation matrix 312 and hashed codeword #1 to the server 210 to be used for future biometrics recognition.

When the second biometric information is input, the electronic device 200 (e.g., the processor 202) may map (e.g., rotate) feature 2 304 extracted from the second biometric information to feature 2' 324 by the transformation matrix 312. The cosine similarity 306 between feature 1 302 and feature 2 304 may be nearly close to a cosine similarity 326 between codeword 1 322 and feature 2' 324.

The electronic device 200 (e.g., the processor 202) may map feature 2' 324 to the most similar (e.g., closest) codeword (e.g., codeword #1 322 or codeword #2 328) by the fuzzy extraction algorithm. In an embodiment of the disclosure, the electronic device 200 (e.g., the processor 202) may find codeword #1 322 or codeword #2 328 close to feature 2' 324 among codewords included in the ECC 320. For example, when the distance (e.g., angular distance) between codeword #1 322 and feature 2' 324 is shorter than the distance 330 between codeword #2 328 and feature 2' 324, the electronic device 200 (e.g., the processor 202) may determine to map feature 2' 324 to codeword #1 322.

The success rate of biometrics recognition may be adjusted according to a tuning level indicating an interval between codewords of the fuzzy extraction algorithm. As the tuning level increases, the true accept rate (TAR) may increase, but the false accept rate (FAR) may increase as well. For this reason, there may be cases in which FAR may not be predicted according to data quality or feature extraction algorithms.

For example, the person corresponding to feature 1 302 and the person corresponding to feature 2 304 may be different, and the electronic device 200 (e.g., the processor 202) may succeed in face recognition based on determining that the angular distance between feature 1 302 and feature 2 304 is greater than a designated threshold (e.g., a reference distance threshold) (e.g., less than a threshold indicating a reference cosine similarity to the cosine similarity 306). However, after the fuzzy extraction algorithm is applied, the electronic device 200 (e.g., the processor 202) may map both feature 1 302 and feature 2 304 to codeword #1 322, and may generate a false acceptance that determines that the person corresponding to feature 1 302 is the same as the person corresponding to feature 2 304.

Figure 4:
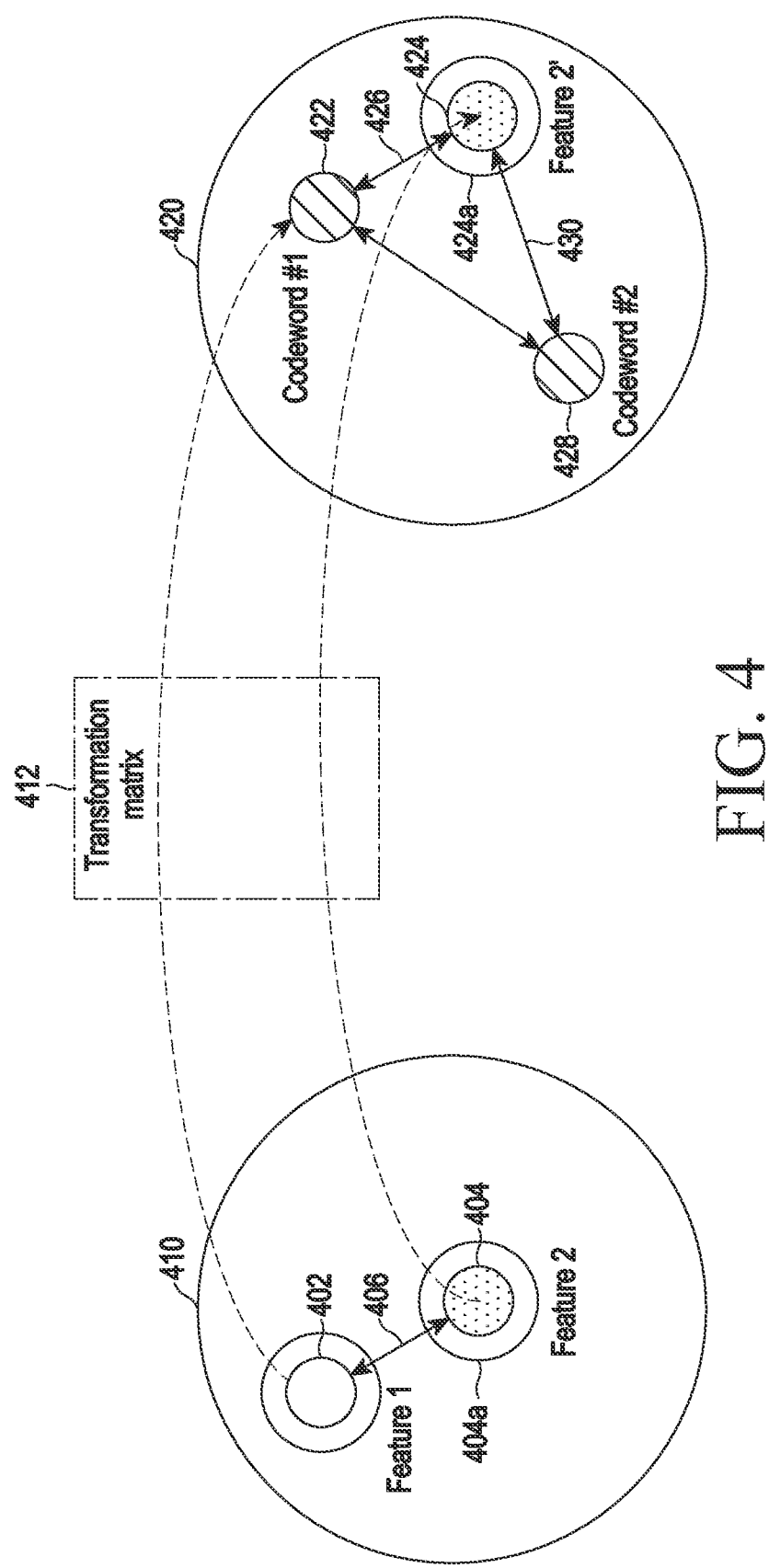
FIG. 4 is a view illustrating an operation for enhancing false acceptance in fuzzy extraction of a mistake-based ECC according to an embodiment of the disclosure.

FIG. 4 is a view illustrating an operation for enhancing false acceptance in fuzzy extraction of a mistake-based ECC according to an embodiment of the disclosure.

Referring to FIG. 4, the electronic device 200 (e.g., the processor 202) may extract feature 1 402 from the first biometric information by a feature extraction algorithm. In an embodiment of the disclosure, the first biometric information may be related to a facial image serving as a reference for biometrics recognition. Further, the electronic device 200 (e.g., the processor 202) may extract feature 2 404 from the second biometric information by the feature extraction algorithm. In an embodiment of the disclosure, the second biometric information may be related to a facial image subject to biometrics recognition. Based on the feature extraction algorithm, feature 1 402 and feature 2 404 may be represented as feature vectors in a designated unit sphere 410, and an angular distance 406 between feature 1 402 and feature 2 404 may be calculated.

The electronic device 200 (e.g., the processor 202) may obtain a transformation matrix 412 for mapping feature 1 402 to codeword #1 422 in the ECC 420. In an embodiment of the disclosure, the transformation matrix 412 may be read out from the memory 204 or may be received from the server 210 through the communication module 208.

When the second biometric information is input, the electronic device 200 (e.g., the processor 202) may map feature 2 404 extracted from the second biometric information to feature 2' 424 by the transformation matrix 412. The angular distance 406 between the feature 1 402 and feature 2 404 may remain close to the angular distance 426 between the codeword #1 422 and feature 2' 424 within a real number operation error range.

The electronic device 200 (e.g., the processor 202) may find a codeword (e.g., codeword #1 422 or codeword #2 428) closest to feature 2' 424 by the fuzzy extraction algorithm.

Before mapping feature 2' 424 to codeword #1 422, the electronic device 200 (e.g., the processor 202) may compare the closeness (e.g., the cosine similarity 426) between feature 2' 424 and codeword #1 422 with the threshold, and may determine that a false acceptance may occur when the cosine similarity 426 is greater than the threshold. The outer circle 404a of feature 2 404 represents a threshold related to the reference cosine similarity of the feature extraction algorithm. If a feature (e.g., feature 1 402) serving as a reference for face recognition is present in the outer circle 404a, the electronic device 200 (e.g., the processor 202) may determine that the person of feature 2 404 is the same as the person of feature 1 402.

In an embodiment of the disclosure, the electronic device 200 (e.g., the processor 202) may find a codeword (e.g., codeword #1 422) close to feature 2' 424 in the ECC 420 and may compare the cosine similarity 426 between feature 2' 424 and codeword #1 422 with the threshold before mapping feature 2' 424 to codeword #1 422. When the cosine similarity 426 is greater than the threshold (e.g., when codeword #1 422 is present in the outer circle 424a of feature 2' 424), the electronic device 200 (e.g., the processor 202) may determine that feature 2' 424 is mapped to codeword #1 422.

In an embodiment of the disclosure, the electronic device 200 (e.g., the processor 202) may find a codeword (e.g., codeword #2 428) close to feature 2' 424 in the ECC 420, and may compare the cosine similarity 430 between feature 2' 424 and codeword #2 428 with the threshold. When the cosine similarity 430 is not greater than the threshold (e.g., when codeword #2 428 is not present in the outer circle 424a of feature 2' 424), the electronic device 200 (e.g., the processor 202) may not map feature 2' 424 to codeword #2 422. If codeword #2 428 is the codeword closest to feature 2' 424 in the ECC 420, the electronic device 200 (e.g., the processor 202) may execute exception handling related to the mapping of feature 2' 424 (e.g., determining that mapping fails and/or encryption stops).

Figure 5:
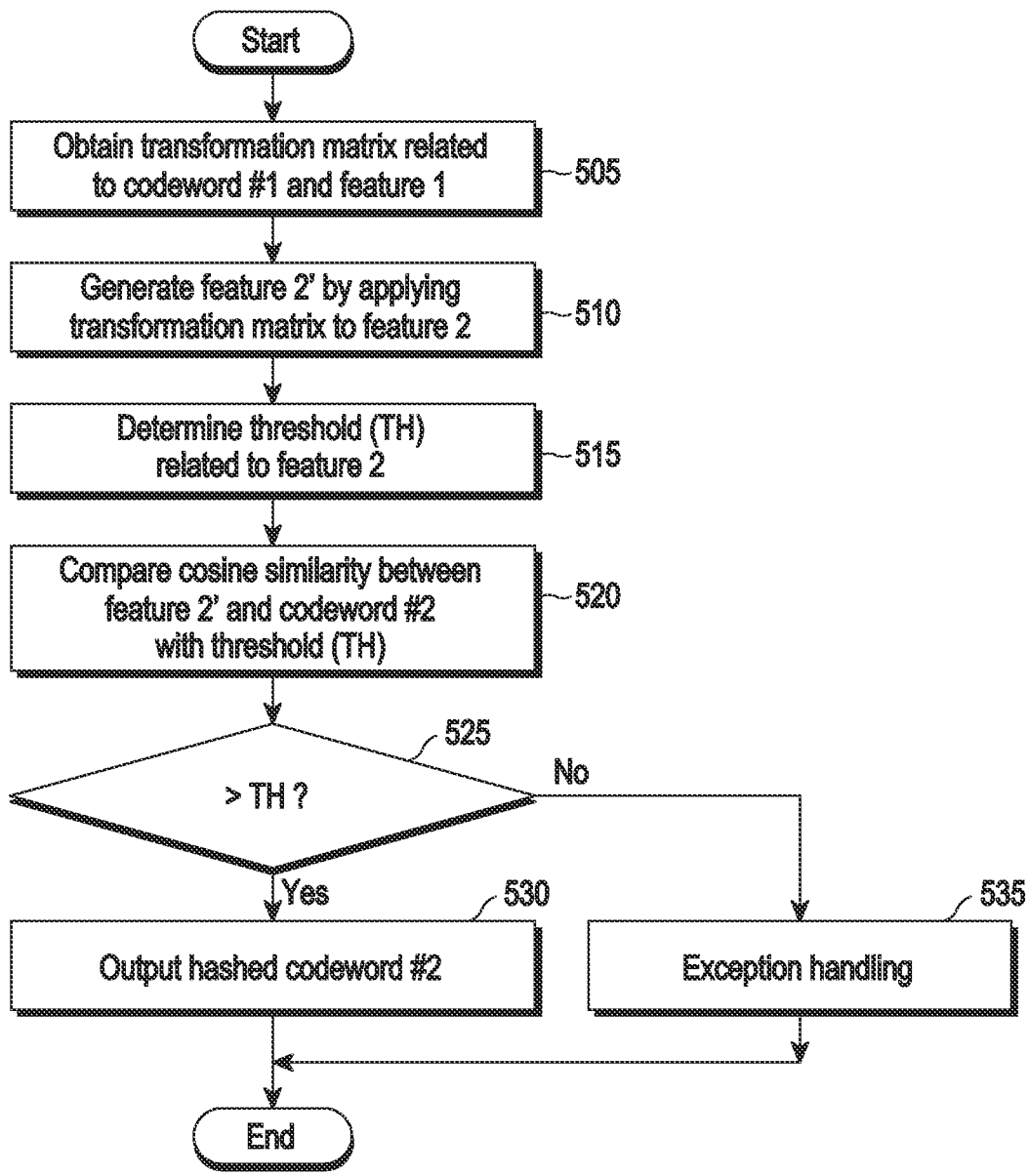
FIG. 5 is a flowchart illustrating a procedure for encrypting biometric information according to an embodiment of the disclosure.

FIG. 5 is a flowchart illustrating a procedure for encrypting biometric information according to an embodiment of the disclosure. At least one of the illustrated operations may be performed, e.g., by the processor 202 of the electronic device 200 described above. The memory 204 of the electronic device 200 may store instructions configured to cause the electronic device 200 to perform at least one of the illustrated operations when executed by the processor 202. Although the shown flowchart is described with a plurality of separate operations, at least some operations may be changed in order, combined with other operations, omitted, or divided into sub-operations, or add one or more operations not shown.

Referring to FIG. 5, in operation 505, the electronic device 200 (e.g., the processor 202) may obtain a transformation matrix (e.g., the transformation matrix 412 or a transformation matrix 612) for mapping feature 1 (e.g., feature 1 402 or a feature vector 608) related to the first biometric information (e.g., a facial image 602) to codeword #1 (e.g., codeword #1 422 or codeword #1 610) in the ECC (e.g., the ECC 420). In an embodiment of the disclosure, the electronic device 200 (e.g., the processor 202) may read the transformation matrix from the memory 204 or may receive the transformation matrix from the server 210 through the communication module 208. In an embodiment of the disclosure, the electronic device 200 (e.g., the processor 202) may receive the transformation matrix from the external electronic device 220 through the input/output interface 206.

In operation 510, the electronic device 200 (e.g., the processor 202) may generate feature 2' (e.g., feature 2' 424 or a feature vector 710) by applying the transform matrix to feature 2 (e.g., feature 2 404 or a feature vector 708) extracted from the second biometric information (e.g., a facial image 702) through the feature extraction algorithm (e.g., the feature extraction module 704).

In operation 515, the electronic device 200 (e.g., the processor 202) may determine a first threshold TH for feature 2' based on a second threshold of the feature extraction algorithm used to generate feature 2. In an embodiment of the disclosure, the first threshold TH may be calculated by adding a designated value (e.g., "eps") to the second threshold.

In operation 520, the electronic device 200 (e.g., the processor 202) may find a codeword (e.g., codeword #2 712) closest to feature 2', and may compare the closeness (e.g., cosine similarity) between feature 2' and codeword #2 with the first threshold TH. In an embodiment of the disclosure, the electronic device 200 (e.g., the processor 202) may select, as the closest codeword, a codeword having an angular distance closest to feature 2' among codewords in the ECC (e.g., the ECC 422).

If the cosine similarity is greater than the first threshold TH in operation 525 (if "Yes" in operation 525), the electronic device 200 (e.g., the processor 202) may proceed to operation 530. If the cosine similarity is not greater than the first threshold TH in operation 525 (if "No" in operation 525), the electronic device 200 (e.g., the processor 202) may proceed to operation 535.

In operation 530, the electronic device 200 (e.g., the processor 202) may map feature 2' to codeword #2 and may generate codeword #2 hashed based on codeword #2 using a designated hash function. The hashed codeword #2 may be considered to include encrypted feature 2. In an embodiment of the disclosure, the electronic device 200 (e.g., the processor 202) may store the hashed codeword #2 in the memory 204 or may transmit the hashed codeword #2 to the server 210 through the communication module 208. In an embodiment of the disclosure, the hashed codeword #2 may be used for face recognition in the electronic device 200 or the server 210. In an embodiment of the disclosure, the electronic device 200 or the server 210 may obtain codeword #2 from the hashed codeword #2, reconstruct feature 2' by decoding codeword #2, and perform face recognition based on the reconstructed feature 2'.

In operation 535, the electronic device 200 (e.g., the processor 202) may execute exception handling related to encryption of feature 2. In an embodiment of the disclosure, the electronic device 200 (e.g., the processor 202) may determine that encryption of feature 2 has failed. In an embodiment of the disclosure, the electronic device 200 (e.g., the processor 202) may encrypt feature 2 using another algorithm.

Figure 6:
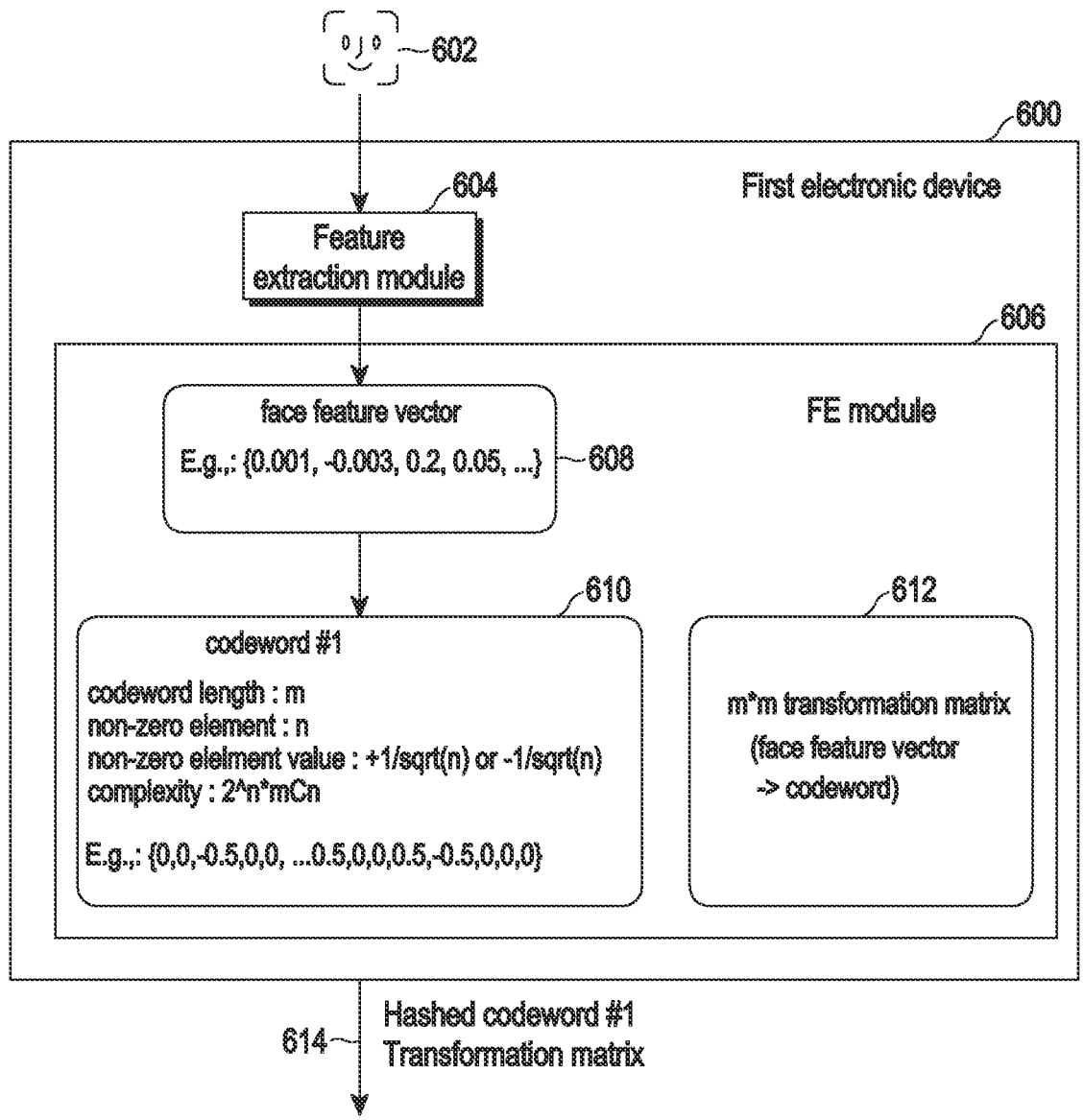
FIG. 6 is a block diagram illustrating an operation for registering a transformation matrix according to an embodiment of the disclosure.

FIG. 6 is a block diagram illustrating an operation for registering a transformation matrix according to an embodiment of the disclosure.

Referring to FIG. 6, a first electronic device 600 (e.g., the electronic device 101 or the electronic device 200) may include a feature extraction module 604 and a fuzzy extraction (FE) module 606. At least one of the feature extraction module 604 or the fuzzy extraction module 606 may be stored in memory (e.g., the memory 130 or the memory 204) and implemented as a software module executable by the processor 202.

The first electronic device 600 may receive a facial image 602. In an embodiment of the disclosure, the first electronic device 600 may directly capture the facial image 602 by an internal camera (e.g., the camera module 180), read the facial image 602 from memory (e.g., the memory 130 or the memory 204), or receive the facial image 602 from an external electronic device (e.g., the server 210) through a communication module (e.g., the communication module 190 or the communication module 208).

The first electronic device 600 may extract at least one first feature vector 608 (e.g., a facial feature vector) indicating at least one biometric feature (e.g., feature 1 402) from the facial image 602 by the feature extraction module 604 (e.g., a facial feature extraction algorithm). For example, the first feature vector 608 is {0.001, −0.003, 0.2, 0.05, . . . }. The first feature vector 608 may be input to the fuzzy extraction module 606.

The first electronic device 600 may generate codeword #1 610 corresponding to the first feature vector 608 and a transform matrix 612 (e.g., the transform matrix 412) by the fuzzy extraction module 606 (e.g., the fuzzy extraction algorithm). In an embodiment of the disclosure, codeword #1 610 having a codeword length m may include n non-zero elements, and the value of each non-zero element is +1/√n or −1/√n. For example, codeword #1 610 is {0, 0, −0.5, 0, 0, . . . , 0.5, 0, 0, 0.5, −0.5, 0, 0, 0}. In an embodiment of the disclosure, the m*m transformation matrix 612 may include a rotation matrix capable of transforming the first feature vector 608 into codeword #1 610. The fuzzy extraction module 606 may generate hashed codeword #1 corresponding to codeword #1 610 by a designated hash function.

The first electronic device 600 may output a result 614 including the hashed codeword #1 and the transformation matrix 612. In an embodiment of the disclosure, the first electronic device 600 may store the hashed codeword #1 and the transformation matrix 612 in the memory 204, may transmit the hashed codeword #1 and the transformation matrix 612 to the external electronic device 220 (e.g., a second electronic device 700) through the input/output interface 206, or may transmit the hashed codeword #1 and the transformation matrix 612 to the server 210 through the communication module 208.

Figure 7:
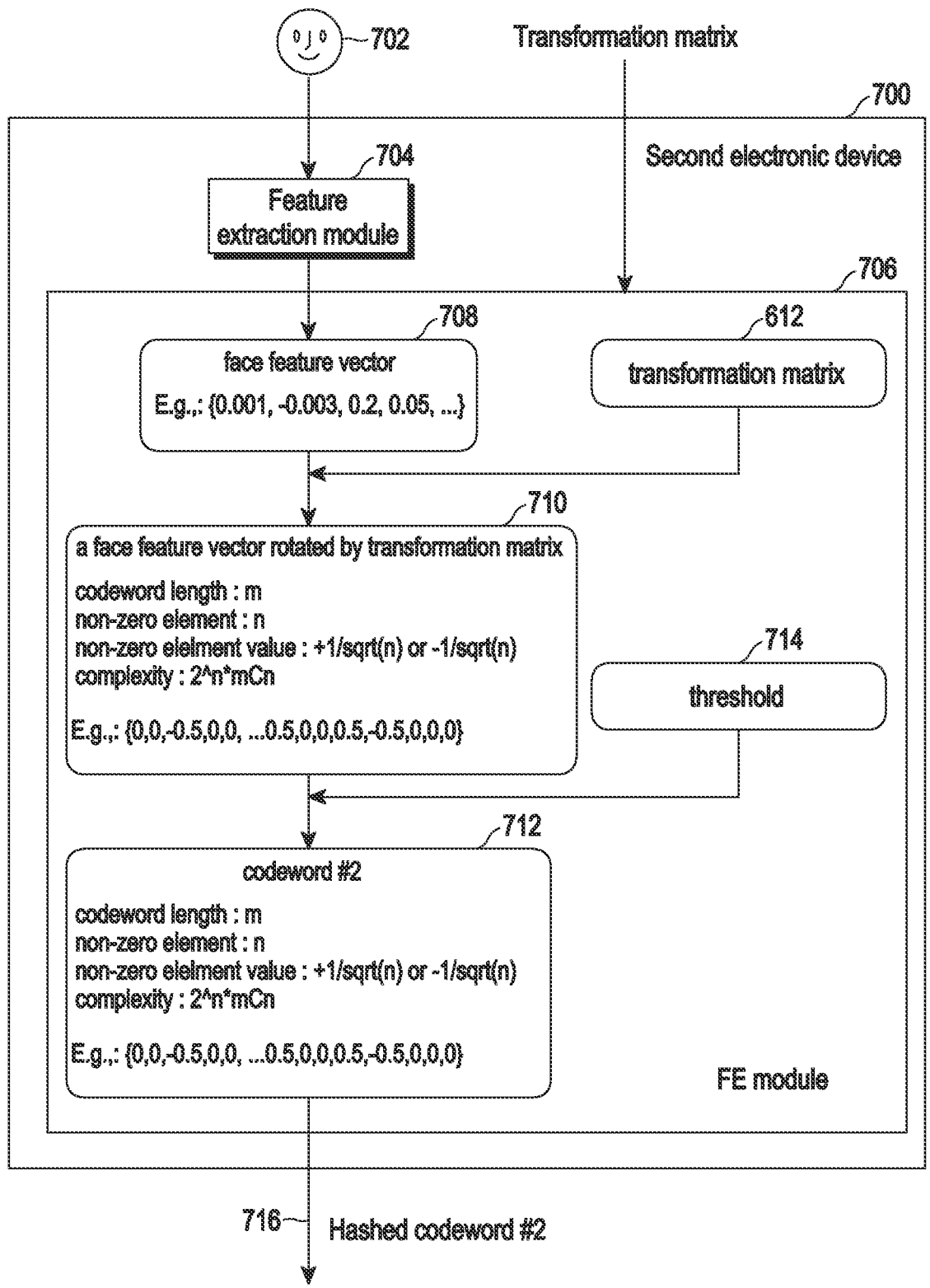
FIG. 7 is a block diagram illustrating an operation for generating a hashed codeword using a transformation matrix according to an embodiment of the disclosure.

FIG. 7 is a block diagram illustrating an operation for generating a hashed codeword using a transformation matrix according to an embodiment of the disclosure.

Referring to FIG. 7, a second electronic device 700 (e.g., the electronic device 101 or the electronic device 200) may include a feature extraction module 704 and a fuzzy extraction (FE) module 706. At least one of the feature extraction module 704 or the fuzzy extraction module 706 may be stored in memory (e.g., the memory 130 or the memory 204) and implemented as a software module executable by the processor 202.

The second electronic device 700 may receive a facial image 702. In an embodiment of the disclosure, the second electronic device 700 may directly capture the facial image 702 by an internal camera (e.g., the camera module 180), read the facial image 702 from memory (e.g., the memory 130 or the memory 204), or receive the facial image 702 from an external electronic device (e.g., the server 210) through a communication module (e.g., the communication module 190 or the communication module 208).

The second electronic device 700 may extract at least one second feature vector 708 (e.g., a facial feature vector) indicating at least one biometric feature (e.g., feature 2 404) from the facial image 702 by the feature extraction module 704 (e.g., a facial feature extraction algorithm). For example, the second feature vector 708 is {0.001, −0.003, 0.2, 0.05, . . . }. In an embodiment of the disclosure, the second feature vector 708 may include the same type of biometric feature as the first feature vector 608. The second feature vector 708 may be input to the fuzzy extraction module 706.

The second electronic device 700 may obtain a transformation matrix 612 (e.g., the transformation matrix 412) by the feature extraction module 704. In an embodiment of the disclosure, the second electronic device 700 may read the transformation matrix 612 from a memory (e.g., the memory 130 or the memory 204) or may receive the transformation matrix 612 from an external electronic device (e.g., the server 210) through a communication module (e.g., the communication module 190 or the communication module 208).

The second electronic device 700 may transform (e.g., rotate) the second feature vector 708 into the third feature vector 710 using the transform matrix 612 by the fuzzy extraction module 706 (e.g., a fuzzy extraction algorithm). In an embodiment of the disclosure, the third feature vector 710 having a codeword length m may include n non-zero elements, and the value of each non-zero element is +1/√n or −1/√n. For example, the third feature vector 710 is {0, 0, −0.5, 0, 0, . . . , 0.5, 0, 0, 0.5, −0.5, 0, 0, 0}.

The second electronic device 700 may find a codeword (e.g., codeword #2 712) closest to the third feature vector 710 in the ECC (e.g., ECC 420) by the fuzzy extraction module 706 (e.g., fuzzy extraction algorithm). In an embodiment of the disclosure, codeword #2 712 having a codeword length m may include n non-zero elements, and the value of each non-zero element is +1/√n or −1/√n. For example, codeword #2 712 is {0, 0, −0.5, 0, 0, . . . , 0.5, 0, 0, 0.5, −0.5, 0, 0, 0}.

The second electronic device 700 may calculate the closeness (e.g., the cosine similarity 430) between the third feature vector 710 and codeword #2 712 by the fuzzy extraction module 706, and may compare the cosine similarity with a threshold 714 corresponding to the reference cosine similarity used to determine whether the persons are the same in the fuzzy extraction module 706. Since the fuzzy extraction module 706 uses a real number-based fuzzy extraction algorithm, the fuzzy extraction module 706 may use the threshold 714 of the real-valued space used by the fuzzy extraction library without conversion. When the cosine similarity is greater than the threshold 714, the second electronic device 700 may determine that the second feature vector 708 is mapped to codeword #2 712 by the fuzzy extraction module 706.

The fuzzy extraction module 706 may generate hashed codeword #2 corresponding to codeword #2 710 by a designated hash function. The second electronic device 700 may output an encryption result 716 including the hashed codeword #2. In an embodiment of the disclosure, the first electronic device 700 may store the hashed codeword #2 in the memory 204, may transmit the hashed codeword #2 to the external electronic device 220 through the input/output interface 206, or may transmit the hashed codeword #2 to the server 210 through the communication module 208.

When the cosine similarity is greater than the threshold 714, the second electronic device 700 may execute exception handling related to encryption of the second feature vector 708 by the fuzzy extraction module 706. For example, the second electronic device 700 (e.g., the fuzzy extraction module 706) may determine that encryption of the second feature vector 708 has failed. In an embodiment of the disclosure, the second electronic device 700 (e.g., the fuzzy extraction module 706) may encrypt the second feature vector 708 using another algorithm.

In an embodiment of the disclosure, the second electronic device 700 may receive biometric information (e.g., a new facial image (not shown)) requiring biometrics recognition based on the hashed codeword #2. The second electronic device 700 may extract a fourth feature vector (not shown) from the new facial image, and may reconstruct the second feature vector 708 by decoding the hashed codeword #2. The second electronic device 700 may compare the cosine similarity between the fourth feature vector and the reconstructed second feature vector 708 with a threshold 714, and when the cosine similarity is not smaller than the threshold 714, the second electronic device 700 may determine that the new facial image is one of the same person having the facial image 702 and output a response indicating the biometrics recognition has succeeded.

The electronic device 200 encrypting biometric information according to an embodiment of the disclosure may comprise memory 204 storing instructions and a processor 202 operatively connected with the memory. The instructions are configured to, when executed by the processor, cause the electronic device to obtain a transformation matrix that maps a first feature value related to first biometric information to a first codeword. The instructions are configured to, when executed by the processor, cause the electronic device to generate a third feature value by applying the transformation matrix to a second feature value related to second biometric information. The instructions are configured to, when executed by the processor, cause the electronic device to compare a cosine similarity between a second codeword most similar to the third feature value and the third feature value with a threshold. The instructions are configured to, when executed by the processor, cause the electronic device to map the second feature value to the second codeword based on the cosine similarity being greater than the threshold. The instructions are configured to, when executed by the processor, cause the electronic device to generate a hashed second codeword based on the second codeword. The instructions are configured to, when executed by the processor, cause the electronic device to transmit or store the hashed second codeword.

In an embodiment of the disclosure, the instructions are configured to, when executed by the processor, cause the electronic device to obtain a reference cosine similarity related to biometrics recognition of the second feature value and determine the threshold based on the reference cosine similarity.

In an embodiment of the disclosure, the instructions are configured to, when executed by the processor, cause the electronic device to, based on the cosine similarity being not greater than the threshold, determine encryption of the second biometric information as failed.

In an embodiment of the disclosure, at least one of the first codeword or the second codeword may be selected from an error correction code (ECC) including designated real-valued codewords.

In an embodiment of the disclosure, the instructions are configured to, when executed by the processor, cause the electronic device to select the second codeword most similar in angular distance to the third feature value from among the codewords in the ECC.

In an embodiment of the disclosure, at least one of the first biometric information or the second biometric information may include a facial image.

In an embodiment of the disclosure, at least one of the first feature value or the second feature value may be generated based on a facial feature extraction algorithm.

In an embodiment of the disclosure, the instructions are configured to, when executed by the processor, cause the electronic device to extract the first feature value from the first biometric information, generate the transformation matrix that maps the first feature value to the first codeword, and store the transformation matrix in the memory.

In an embodiment of the disclosure, the instructions are configured to, when executed by the processor, cause the electronic device to transmit information of the transformation matrix to a server.

In an embodiment of the disclosure, the transformation matrix may include a rotation matrix.

According to an embodiment of the disclosure, a method for operating an electronic device 200 to encrypt biometric information may comprise, in operation 505, obtaining a transformation matrix that maps a first feature value related to first biometric information to a first codeword. The method may comprise, in operation 510, generating a third feature value by applying the transformation matrix to a second feature value related to second biometric information. The method may comprise, in operation 520, comparing a cosine similarity between a second codeword most similar to the third feature value and the third feature value with a threshold. The method may comprise, in operation 525, mapping the second feature value to the second codeword based on the cosine similarity being greater than the threshold. The method may comprise, in operation 530, generating a hashed second codeword based on the second codeword. The method may comprise transmitting or storing the hashed second codeword.

In an embodiment of the disclosure, the method may further comprise obtaining a reference cosine similarity related to biometrics recognition of the second feature value and, in operation 515, determining the threshold based on the reference cosine similarity.

In an embodiment of the disclosure, the method may further comprise, based on the cosine similarity being not greater than the threshold, determining encryption of the second biometric information as failed.

In an embodiment of the disclosure, at least one of the first codeword or the second codeword may be selected from an error correction code (ECC) including designated real-valued codewords.

In an embodiment of the disclosure, the method may further comprise selecting the second codeword most similar in angular distance to the third feature value from among the codewords in the ECC.

In an embodiment of the disclosure, at least one of the first biometric information or the second biometric information may include a facial image.

In an embodiment of the disclosure, at least one of the first feature value or the second feature value may be generated based on a facial feature extraction algorithm.

In an embodiment of the disclosure, the method may further comprise extracting the first feature value from the first biometric information, generating the transformation matrix that maps the first feature value to the first codeword, and storing the transformation matrix.

In an embodiment of the disclosure, the method may further comprise transmitting information of the transformation matrix to a server.

In an embodiment of the disclosure, the transformation matrix may include a rotation matrix.

In an embodiment of the disclosure, one or more non-transitory computer-readable storage medium storing one or more programs is disclosed. The one or more programs may comprises instructions configured to, when executed by a processor of an electronic device, cause the electronic device to: obtain a transformation matrix that maps a first feature value related to first biometric information to a first codeword, generate a third feature value by applying the transformation matrix to a second feature value related to second biometric information, compare a cosine similarity between a second codeword most similar to the third feature value and the third feature value with a threshold, map the second feature value to the second codeword based on the cosine similarity being greater than the threshold, generate a hashed second codeword based on the second codeword, and transmit or store the hashed second codeword.

In an embodiment of the disclosure, the instructions are configured to, when executed by the processor of the electronic device, cause the electronic device to: obtain a reference cosine similarity related to biometrics recognition of the second feature value; and determine the threshold based on the reference cosine similarity.

In an embodiment of the disclosure, the instructions are configured to, when executed by the processor of the electronic device, cause the electronic device to, based on the cosine similarity being not greater than the threshold, determine encryption of the second biometric information as failed.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., the memory 204, internal memory 136 or external memory 138) that is readable by a machine (e.g., the electronic device 200). For example, a processor (e.g., the processor 202 or processor 120) of the machine (e.g., the electronic device 200) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The storage medium readable by the machine may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities. Some of the plurality of entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the scope of the disclosure as defined by the appended claims and their equivalents.

What is claimed is:

1. An electronic device encrypting biometric information, the electronic device comprising:
   memory for storing instructions; and
   a processor operatively connected with the memory,
   wherein the instructions are configured to, when executed by the processor, cause the electronic device to:
      obtain a transformation matrix that maps a first feature value related to first biometric information to a first codeword,
      generate a third feature value by applying the transformation matrix to a second feature value related to second biometric information,
      compare a cosine similarity between a second codeword most similar to the third feature value among designated codewords and the third feature value with a threshold,
      map the second feature value to the second codeword based on the cosine similarity being greater than the threshold, generate a hashed second codeword based on the second codeword, and transmitting or storing the hashed second codeword.

2. The electronic device of claim 1, wherein the instructions are configured to, when executed by the processor, cause the electronic device to:
obtain a reference cosine similarity related to biometrics recognition of the second feature value, and
determine the threshold based on the reference cosine similarity.

3. The electronic device of claim 1, wherein the instructions are configured to, when executed by the processor, cause the electronic device to:
based on the cosine similarity being not greater than the threshold, determine encryption of the second biometric information as failed.

4. The electronic device of claim 1, wherein at least one of the first codeword or the second codeword is selected from an error correction code (ECC) including designated real-valued codewords.

5. The electronic device of claim 4, wherein the instructions are configured to, when executed by the processor, cause the electronic device to:
select the second codeword most similar in angular distance to the third feature value from among the codewords in the ECC.

6. The electronic device of claim 1, wherein at least one of the first biometric information or the second biometric information includes a facial image.

7. The electronic device of claim 1, wherein at least one of the first feature value or the second feature value is generated based on a facial feature extraction algorithm.

8. The electronic device of claim 1, wherein the instructions are configured to, when executed by the processor, cause the electronic device to:
extract the first feature value from the first biometric information;
generate the transformation matrix that maps the first feature value to the first codeword; and
store the transformation matrix in the memory.

9. The electronic device of claim 8, wherein the instructions are configured to, when executed by the processor, cause the electronic device to transmit information of the transformation matrix to a server.

10. The electronic device of claim 1, wherein the transformation matrix includes a rotation matrix.

11. A method for operating an electronic device encrypting biometric information, the method comprising:
obtaining a transformation matrix that maps a first feature value related to first biometric information to a first codeword;
generating a third feature value by applying the transformation matrix to a second feature value related to second biometric information;
comparing a cosine similarity between a second codeword most similar to the third feature value and the third feature value with a threshold;
mapping the second feature value to the second codeword based on the cosine similarity being greater than the threshold; and generating a hashed second codeword based on the second codeword; and transmitting or storing the hashed second codeword.

12. The method of claim 11, further comprising:
obtaining a reference cosine similarity related to biometrics recognition of the second feature value;
determining the threshold based on the reference cosine similarity.

13. The method of claim 11, further comprising, based on the cosine similarity being not greater than the threshold, determining encryption of the second biometric information as failed.

14. The method of claim 11, wherein at least one of the first codeword or the second codeword is selected from an error correction code (ECC) including designated real-valued codewords.

15. The method of claim 14, further comprising selecting the second codeword most similar in angular distance to the third feature value from among the codewords in the ECC.

16. The method of claim 11, wherein at least one of the first biometric information or the second biometric information includes a facial image.

17. The method of claim 11, wherein at least one of the first feature value or the second feature value is generated based on a facial feature extraction algorithm.

18. The method of claim 11, further comprising:
extracting the first feature value from the first biometric information;
generating the transformation matrix that maps the first feature value to the first codeword; and
storing the transformation matrix.

19. The method of claim 18, further comprising:
transmitting information of the transformation matrix to a server;
wherein the transformation matrix includes a rotation matrix.

20. One or more non-transitory computer-readable storage medium storing one or more programs, the one or more programs comprising instructions configured to, when executed by a processor of an electronic device, cause the electronic device to:
obtain a transformation matrix that maps a first feature value related to first biometric information to a first codeword;
generate a third feature value by applying the transformation matrix to a second feature value related to second biometric information;
compare a cosine similarity between a second codeword most similar to the third feature value and the third feature value with a threshold;
map the second feature value to the second codeword based on the cosine similarity being greater than the threshold;
generate a hashed second codeword based on the second codeword; and
transmit or store the hashed second codeword.

* * * * *